(12) United States Patent
Yoshiyasu

(10) Patent No.: US 11,370,899 B2
(45) Date of Patent: *Jun. 28, 2022

(54) RUBBER COMPOSITION FOR TIRES, AND PNEUMATIC TIRES

(71) Applicant: SUMITOMO RUBBER INDUSTRIES, LTD., Kobe (JP)

(72) Inventor: Hayato Yoshiyasu, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/498,997

(22) PCT Filed: Apr. 13, 2018

(86) PCT No.: PCT/JP2018/015566
§ 371 (c)(1),
(2) Date: Sep. 27, 2019

(87) PCT Pub. No.: WO2018/190429
PCT Pub. Date: Oct. 18, 2018

(65) Prior Publication Data
US 2020/0048437 A1 Feb. 13, 2020

(30) Foreign Application Priority Data
Apr. 14, 2017 (JP) .............................. JP2017-080969

(51) Int. Cl.
*C08L 7/00* (2006.01)
*B60C 1/00* (2006.01)
*B60C 11/00* (2006.01)
*C08L 9/00* (2006.01)

(52) U.S. Cl.
CPC ............. *C08L 7/00* (2013.01); *B60C 1/0016* (2013.01); *B60C 11/0008* (2013.01); *C08L 9/00* (2013.01); *C08L 2205/03* (2013.01)

(58) Field of Classification Search
CPC ..................................... C08L 7/00; C08L 9/00
See application file for complete search history.

(56) References Cited

U.S. PATENT DOCUMENTS

| 5,877,249 A | * | 3/1999 | Lambotte | .................. C08L 9/00 524/493 |
| 2017/0158845 A1 | * | 6/2017 | Nakajima | ................ C08K 3/04 |
| 2018/0273723 A1 | | 9/2018 | Sato et al. | |

FOREIGN PATENT DOCUMENTS

| CN | 104487506 A | 4/2015 |
| CN | 105764974 A | 7/2016 |
| CN | 106317112 A | 1/2017 |
| JP | 2011-89032 A | 5/2011 |
| JP | 2016-6139 A | 1/2016 |
| JP | 2016-44271 A | 4/2016 |
| JP | 2016-94556 A | 5/2016 |
| WO | WO 2009/146018 A1 | 12/2009 |
| WO | WO 2017/057758 A1 | 4/2017 |

OTHER PUBLICATIONS

International Search Report, issued in PCT/JP2018/015566, PCT/ISA/210, dated Jul. 10, 2018.
Written Opinion of the International Searching Authority, issued in PCT/JP2018/015566, PCT/ISA/237, dated Jul. 10, 2018.

* cited by examiner

*Primary Examiner* — Arrie L Reuther
(74) *Attorney, Agent, or Firm* — Birch, Stewart, Kolasch & Birch LLP

(57) ABSTRACT

The present invention provides a rubber composition for tires which provides a balanced improvement in ice performance, fuel economy, and abrasion resistance, and a pneumatic tire containing the rubber composition. The present invention relates to a rubber composition for tires containing a rubber component including at least 80% by mass in total of at least one of an isoprene-based rubber, a polybutadiene rubber, or a styrene-butadiene rubber, the rubber composition containing, per 100 parts by mass of the rubber component, 10 to 120 parts by mass of silica, 0.2 to 10 parts by mass of a tetrazine compound of formula (1), and 1 to 50 parts by mass of a low-molecular-weight diene polymer having a weight average molecular weight of 200,000 or less.

9 Claims, No Drawings

RUBBER COMPOSITION FOR TIRES, AND PNEUMATIC TIRES

TECHNICAL FIELD

The present invention relates to a rubber composition for tires, and a pneumatic tire.

BACKGROUND ART

In recent years, silica has been incorporated into rubber compositions for studless winter tires to improve the balance between ice performance and fuel economy (see, for example, Patent Literatures 1 and 2). However, because of the poor affinity between silica and rubber, the incorporated silica cannot perform its inherent function. Thus, the conventional techniques leave room for improvement to achieve a balanced improvement in ice performance, fuel economy, and abrasion resistance.

CITATION LIST

Patent Literature

Patent Literature 1: JP 2016-44271 A
Patent Literature 2: JP 2016-94556 A

SUMMARY OF INVENTION

Technical Problem

The present invention aims to provide a rubber composition for tires which provides a balanced improvement in ice performance, fuel economy, and abrasion resistance, and a pneumatic tire containing the rubber composition.

Solution to Problem

The present invention relates to a rubber composition for tires, containing a rubber component including at least 80% by mass in total of at least one of an isoprene-based rubber, a polybutadiene rubber, or a styrene-butadiene rubber, the rubber composition containing, per 100 parts by mass of the rubber component: 10 to 120 parts by mass of silica; 0.2 to 10 parts by mass of a tetrazine compound represented by the formula (1) below; and 1 to 50 parts by mass of a low-molecular-weight diene polymer having a weight average molecular weight of 200,000 or less,

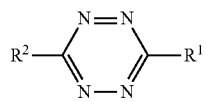
(1)

wherein $R^1$ and $R^2$ may be the same or different and each represent a hydrogen atom, —$COOR^3$ in which $R^3$ represents either a hydrogen atom or an alkyl group, or a C1-C11 monovalent hydrocarbon group optionally containing a heteroatom, and $R^1$ and $R^2$ may each form a salt.

The tetrazine compound is preferably a compound represented by the following formula (1-1), (1-2), (1-3), or (1-4):

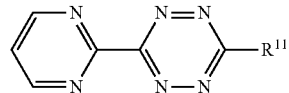
(1-1)

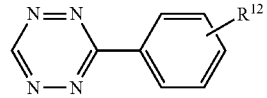
(1-2)

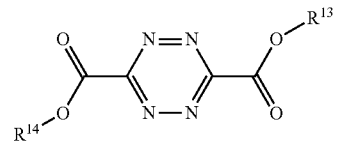
(1-3)

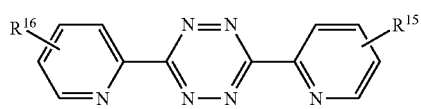
(1-4)

wherein in formula (1-1), $R^{11}$ represents a hydrogen atom, —$COOR^{17}$ in which $R^{17}$ represents either a hydrogen atom or an alkyl group, or a C1-C11 monovalent hydrocarbon group optionally containing a heteroatom, and $R^{11}$ may form a salt;

in formula (1-2), $R^{12}$ represents a functional group containing at least one atom selected from the group consisting of nitrogen, oxygen, sulfur, fluorine, and silicon atoms, and $R^{12}$ may form a salt;

in formula (1-3), $R^{13}$ and $R^{14}$ may be the same or different and each represent a hydrogen atom or an alkyl group, and $R^{13}$ and $R^{14}$ may each form a salt; and in formula (1-4), $R^{15}$ and $R^{16}$ may be the same or different and each represent a hydrogen atom, —$COOR^{18}$ in which $R^{18}$ represents either a hydrogen atom or an alkyl group, or a functional group containing at least one atom selected from the group consisting of nitrogen, oxygen, sulfur, fluorine, and silicon atoms, and $R^{15}$ and $R^{16}$ may each form a salt.

The tetrazine compound is preferably a compound represented by the following formula (1-1-1), (1-1-2), (1-2-1), (1-3-1), (1-4-1), or (1-4-2):

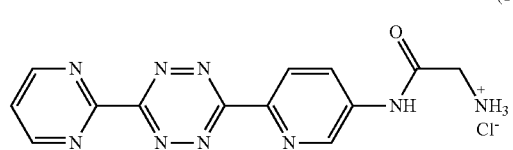
(1-1-1)

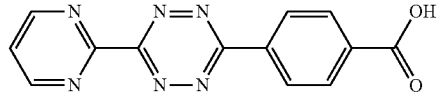
(1-1-2)

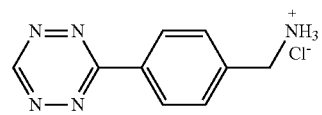
(1-2-1)

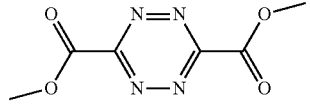
(1-3-1)

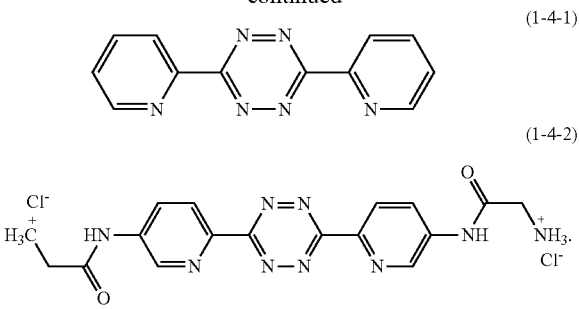

(1-4-1)

(1-4-2)

The polybutadiene rubber is preferably present in an amount of 15 to 80% by mass based on 100% by mass of the rubber component.

The isoprene-based rubber is preferably present in an amount of 15 to 80% by mass based on 100% by mass of the rubber component.

The present invention also relates to a pneumatic tire, including a tread containing the rubber composition.

The pneumatic tire is preferably a studless winter tire.

Advantageous Effects of Invention

The rubber composition for tires of the present invention contains a rubber component including at least 80% by mass in total of at least one of an isoprene-based rubber, a polybutadiene rubber, or a styrene-butadiene rubber. Further, the rubber composition contains, per 100 parts by mass of the rubber component, 10 to 120 parts by mass of silica, 0.2 to 10 parts by mass of a tetrazine compound of formula (1), and 1 to 50 parts by mass of a low-molecular-weight diene polymer having a weight average molecular weight of 200,000 or less. Thus, the rubber composition provides a balanced improvement in ice performance, fuel economy, and abrasion resistance.

DESCRIPTION OF EMBODIMENTS

The rubber composition for tires of the present invention contains a rubber component including at least 80% by mass in total of at least one of an isoprene-based rubber, a polybutadiene rubber, or a styrene-butadiene rubber. Further, the rubber composition contains, per 100 parts by mass of the rubber component, 10 to 120 parts by mass of silica, 0.2 to 10 parts by mass of a tetrazine compound of formula (1), and 1 to 50 parts by mass of a low-molecular-weight diene polymer having a weight average molecular weight of 200,000 or less.

The present invention provides a balanced improvement in ice performance, fuel economy, and abrasion resistance. The mechanism of this effect may be explained as follows.

The tetrazine compound reacts with the at least one diene rubber, specifically the double bonds of the diene rubber, such that the number of side chains of the diene rubber is increased. As these side chains interact with silica, the diene rubber has improved affinity with silica, so that it is possible to disperse silica in the vicinity of the diene rubber and therefore to disperse silica more uniformly in the rubber composition. This effect is more suitably achieved when a polybutadiene rubber having inherently poor affinity with silica, particularly a polybutadiene rubber having a cis content of 97% by mass or higher, is used.

Thus, in the present invention, it is considered that since a rubber component including at least a predetermined amount of at least one diene rubber is combined with a predetermined amount of silica as well as predetermined amounts of a tetrazine compound of formula (1) and a low-molecular-weight diene polymer, the number of side chains of the at least one diene rubber is sufficiently increased to improve the affinity between the diene rubber and silica, as a result of which the silica produces its reinforcing effect. In addition, the diene rubber with an increased number of side chains is also considered to have improved affinity with the low-molecular-weight diene polymer. Furthermore, the low-molecular-weight diene polymer that is compatible with the diene rubber is believed to increase the distance between the rubber component molecules without inhibiting the affinity between the tetrazine compound and silica, thereby further improving ice performance. Presumably for these reasons, a balanced improvement in ice performance, fuel economy, and abrasion resistance is achieved. Thus, the present invention synergistically improves the balance of ice performance, fuel economy, and abrasion resistance by interaction of the polybutadiene rubber, tetrazine compound, silica, and low-molecular-weight diene polymer.

The rubber component in the present invention includes any one or combination of diene rubbers as long as it includes at least 80% by mass in total of at least one of an isoprene-based rubber, a polybutadiene rubber (BR), or a styrene-butadiene rubber (SBR).

The combined amount of the isoprene-based rubber, BR, and SBR based on 100% by mass of the rubber component is 80% by mass or more, preferably 90% by mass or more, and may be 100% by mass.

In the present invention, the combined amount of the isoprene-based rubber and polybutadiene rubber based on 100% by mass of the rubber component is preferably 30 to 100% by mass. To more suitably achieve the effects of the present invention to achieve a more balanced improvement in ice performance, fuel economy, and abrasion resistance, the combined amount is more preferably 50% by mass or more, still more preferably 70% by mass or more, particularly preferably 80% by mass or more.

The rubber component in the present invention preferably includes a polybutadiene rubber (BR) or preferably includes an isoprene-based rubber and a polybutadiene rubber (BR).

In the present invention, the term "rubber component" refers to at least one rubber having a weight average molecular weight (Mw) of 300,000 or more, preferably 350,000 or more. The upper limit of the Mw is not particularly limited, but is preferably 1,500,000 or less, more preferably 1,000,000 or less.

Herein, the Mw may be determined by gel permeation chromatography (GPC) (GPC-8000 series available from Tosoh Corporation, detector: differential refractometer, column: TSKGEL SUPERMALTPORE HZ-M available from Tosoh Corporation) calibrated with polystyrene standards.

Examples of the isoprene-based rubber include natural rubber (NR), polyisoprene rubber (IR), refined NR, modified NR, and modified IR. The NR may be one commonly used in the tire industry such as SIR20, RSS #3, or TSR20. Any IR may be used, and examples include those commonly used in the tire industry, such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These may be used alone, or two or more of these may be used in combination. NR is preferred among these.

The amount of the isoprene-based rubber, if present, based on 100% by mass of the rubber component is preferably 15% by mass or more, more preferably 25% by mass or more, still more preferably 40% by mass or more, but is preferably 80% by mass or less, more preferably 70% by mass or less, still more preferably 60% by mass or less. When the amount is adjusted within the range indicated above, the effects of the present invention tend to be better achieved.

Any BR may be used. Examples include BR having high cis content, such as BR1220 available from Zeon Corporation and BR130B and BR150B both available from Ube Industries, Ltd.; BR containing syndiotactic polybutadiene crystals, such as VCR412 and VCR617 both available from Ube Industries, Ltd.; and BR synthesized using rare earth catalysts (rare earth-catalyzed BR). These may be used alone, or two or more of these may be used in combination. In particular, the BR preferably has a cis content of 97% by mass or more to improve abrasion resistance.

The BR preferably has a weight average molecular weight (Mw) of 300,000 or more, more preferably 350,000 or more, but preferably 550,000 or less, more preferably 500,000 or less, still more preferably 450,000 or less. When the Mw is within the range indicated above, the effects of the present invention can be more suitably achieved.

The BR may be an unmodified or modified BR.

The modified BR may be any BR having a functional group interactive with a filler such as silica. For example, it may be a chain end-modified BR obtained by modifying at least one chain end of BR with a compound (modifier) having the functional group (a chain end-modified BR terminated with the functional group); a backbone-modified BR having the functional group in the backbone; a backbone- and chain end-modified BR having the functional group in both the backbone and chain end (e.g., a backbone- and chain end-modified BR in which the backbone has the functional group and at least one chain end is modified with the modifier); or a chain end-modified BR that has been modified (coupled) with a polyfunctional compound having two or more epoxy groups in the molecule so that a hydroxyl or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. To more suitably achieve the effects of the present invention, amino (preferably amino whose hydrogen atom is replaced with a C1-C6 alkyl group), alkoxy (preferably C1-C6 alkoxy), and alkoxysilyl (preferably C1-C6 alkoxysilyl) groups are preferred among these.

The BR may be a commercial product of, for example, Ube Industries, Ltd., JSR Corporation, Asahi Kasei Corporation, or Zeon Corporation.

The amount of the BR based on 100% by mass of the rubber component is preferably 15% by mass or more, more preferably 25% by mass or more, still more preferably 40% by mass or more, but is preferably 80% by mass or less, more preferably 70% by mass or less, still more preferably 60% by mass or less. When the amount is adjusted within the range indicated above, the effects of the present invention tend to be better achieved.

Any SBR may be used. Examples include emulsion-polymerized styrene-butadiene rubber (E-SBR) and solution-polymerized styrene-butadiene rubber (S-SBR). These may be used alone, or two or more of these may be used in combination.

The bound styrene content of the SBR is preferably 5% by mass or higher, more preferably 20% by mass or higher, still more preferably 25% by mass or higher. When the bound styrene content is not lower than the lower limit, excellent wet grip performance tends to be sufficiently obtained. The bound styrene content is also preferably 60% by mass or lower, more preferably 40% by mass or lower. When the bound styrene content is not higher than the upper limit, excellent abrasion resistance and fuel economy tend to be obtained.

Herein, the bound styrene content of the SBR is determined by $H^1$-NMR.

The SBR may be a commercial product manufactured or sold by, for example, Sumitomo Chemical Co., Ltd., JSR Corporation, Asahi Kasei Corporation, or Zeon Corporation.

The SBR may be an unmodified or modified SBR. Examples of the modified SBR include those in which functional groups as mentioned for the modified BR are introduced.

Examples of rubbers other than the isoprene-based rubber, BR, and SBR which may be used in the rubber component include diene rubbers such as styrene-isoprene-butadiene rubber (SIBR), ethylene-propylene-diene rubber (EPDM), chloroprene rubber (CR), and acrylonitrile butadiene rubber (NBR), and butyl-based rubbers. These may be used alone, or two or more of these may be used in combination.

The rubber composition of the present invention contains a tetrazine compound represented by the following formula (1):

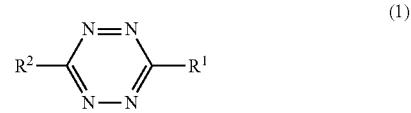

(1)

wherein $R^1$ and $R^2$ may be the same or different and each represent a hydrogen atom (—H), —$COOR^3$ in which $R^3$ represents either a hydrogen atom (—H) or an alkyl group, or a C1-C11 monovalent hydrocarbon group optionally containing a heteroatom, and $R^1$ and $R^2$ may each form a salt.

Examples of the heteroatom include nitrogen, oxygen, and sulfur atoms.

The hydrocarbon group as $R^1$ or $R^2$ has 1 to 11 carbon atoms, preferably 2 to 9 carbon atoms, more preferably 4 to 7 carbon atoms.

$R^1$ and $R^2$ are each preferably —$COOR^3$ or a heteroatom-containing hydrocarbon group because such a tetrazine compound is expected to interact easily with a reinforcing filler, particularly carbon black or silica, thereby resulting in better ice performance, fuel economy, and abrasion resistance. More preferably, both $R^1$ and $R^2$ are heteroatom-containing hydrocarbon groups.

The hydrocarbon group as $R^1$ or $R^2$ is not particularly limited, but is preferably a homocyclic or heterocyclic group because such a tetrazine compound is expected to interact easily with a reinforcing filler, particularly carbon black or silica, thereby resulting in better ice performance, fuel economy, and abrasion resistance. More preferably, at least one of $R^1$ and $R^2$ is a heterocyclic group. Still more preferably, both $R^1$ and $R^2$ are heterocyclic groups.

Herein, the term "homocyclic group" refers to a group having a ring structure consisting only of carbon atoms, and the term "heterocyclic group" refers to a group having a ring structure consisting of two or more types of elements including a carbon atom.

Examples of the homocyclic group include aryl and cycloalkyl groups. Among these, aryl groups are preferred.

Examples of aryl groups include phenyl and naphthyl groups. Among these, a phenyl group is preferred.

Examples of cycloalkyl groups include cyclopentyl and cyclohexyl groups.

The heterocyclic group is preferably a nitrogen-containing heterocyclic group which contains a nitrogen atom as a ring-forming heteroatom, more preferably a nitrogen-containing heterocyclic group which contains only a nitrogen atom as a ring-forming heteroatom.

Examples of the nitrogen-containing heterocyclic group include aziridinyl, azetidinyl, pyrrolidinyl, piperidinyl, hexamethyleneimino, imidazolidyl, piperazinyl, pyrazolidyl, pyrrolyl, imidazolyl, pyrazolyl, pyridyl, pyridazyl, pyrimidyl, pyrazyl, quinolyl, isoquinolyl, cinnolinyl, quinazolinyl, and phthalazinyl groups. Among these, pyridyl and pyrimidyl groups are preferred, with a pyridyl group being more preferred.

The hydrogen atom in the homocyclic or heterocyclic group may be replaced by a substituent. Preferably, it is replaced by a substituent because such a tetrazine compound is expected to interact easily with a reinforcing filler, particularly carbon black or silica, thereby resulting in better ice performance, fuel economy, and abrasion resistance.

Examples of the substituent include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, epoxy, sulfonate, and trifluoromethyl groups. These substituents may be further substituted by the above-listed substituents or groups other than the above-listed substituents, such as alkylene or alkyl groups. To more suitably achieve the effects of the present invention, the substituent is preferably a carboxyl group, the above-defined —COOR$^3$, an amino group (preferably a group represented by the formula (A) or (B) below), an alkoxy group (preferably a C1-C6 alkoxy group), or an alkoxysilyl group (preferably a C1-C6 alkoxysilyl group), among others.

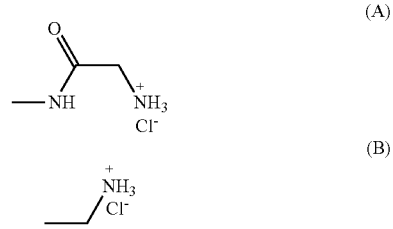

The substituent may form a salt, as in the group of formula (A) or (B). Examples of salts that may be formed include salts formed between an amino group and a halogen atom, salts formed between a carboxyl group and a monovalent metal such as Na or K, and salts formed between a sulfonate group and the monovalent metal.

R$^3$ in the group —COOR$^3$ represents a hydrogen atom or an alkyl group. The alkyl group preferably has 1 to 8 carbon atoms, more preferably 1 to 3 carbon atoms.

Examples of the alkyl group include methyl, ethyl, n-propyl, isopropyl, n-butyl, sec-butyl, and tert-butyl groups.

R$^3$ is preferably an alkyl group.

The tetrazine compound of formula (1) may be any tetrazine compound that can react with a diene rubber. The tetrazine compound may be a single compound or a combination of two or more compounds. To more suitably achieve the effects of the present invention, the tetrazine compound is preferably a compound represented by the formula (1-1), (1-2), (1-3), or (1-4) below (particularly formula (1-1) or (1-4)), more preferably a compound represented by the formula (1-1-1), (1-1-2), (1-2-1), (1-3-1), (1-4-1), or (1-4-2) below (particularly formula (1-1-1) or (1-4-1)), among others.

The tetrazine compound of formula (1) may be a commercial product or may be synthesized by known methods.

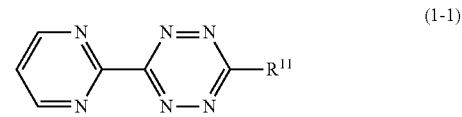

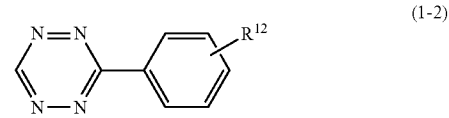

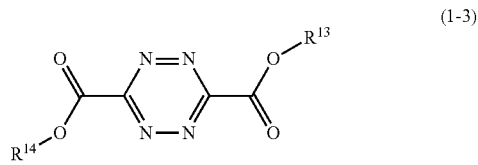

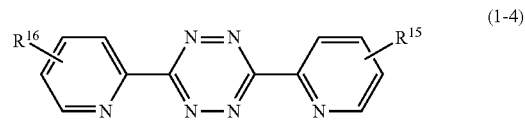

In formula (1-1), R$^{11}$ represents a hydrogen atom (—H), —COOR$^{17}$ in which R$^{17}$ represents either a hydrogen atom (—H) or an alkyl group, or a C1-C11 monovalent hydrocarbon group optionally containing a heteroatom, and R$^{11}$ may form a salt.

In formula (1-2), R$^{12}$ represents a functional group containing at least one atom selected from the group consisting of nitrogen, oxygen, sulfur, fluorine, and silicon atoms, and R$^{12}$ may form a salt.

In formula (1-3), R$^{13}$ and R$^{14}$ may be the same or different and each represent a hydrogen atom (—H) or an alkyl group, and R$^{13}$ and R$^{14}$ may each form a salt.

In formula (1-4), R$^{15}$ and R$^{16}$ may be the same or different and each represent a hydrogen atom (—H), —COOR$^{18}$ in which R$^{18}$ represents either a hydrogen atom (—H) or an alkyl group, or a functional group containing at least one atom selected from the group consisting of nitrogen, oxygen, sulfur, fluorine, and silicon atoms, and R$^{15}$ and R$^{16}$ may each form a salt.

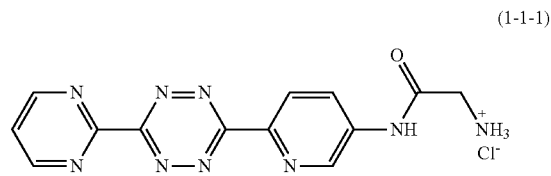

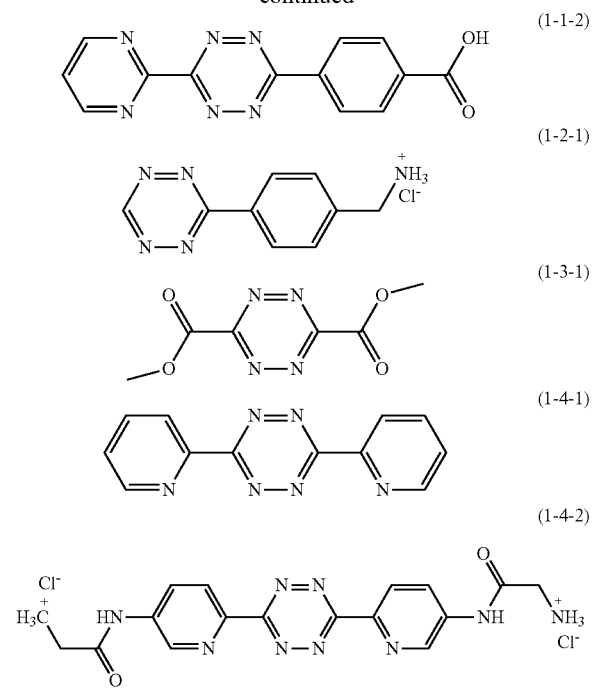

Examples of the heteroatom in $R^{11}$ include those described for the heteroatom in $R^1$ or $R^2$.

The carbon number of the hydrocarbon group as $R^{11}$ is as described for the hydrocarbon group as $R^1$ or $R^2$, and suitable embodiments thereof are also the same as above.

$R^{11}$ is preferably —COOR$^{17}$ or a heteroatom-containing hydrocarbon group because such a tetrazine compound is expected to interact easily with a reinforcing filler, particularly carbon black or silica, thereby resulting in better ice performance, fuel economy, and abrasion resistance.

Examples of the hydrocarbon group as $R^{11}$ include those described for the hydrocarbon group as $R^1$ or $R^2$, and suitable embodiments thereof are also the same as above.

$R^{17}$ in the group —COOR$^{17}$ represents a hydrogen atom or an alkyl group. Examples of the alkyl group include those described for the alkyl group as $R^3$, and suitable embodiments thereof are also the same as above.

$R^{17}$ is preferably an alkyl group.

Examples of the functional group containing at least one atom selected from the group consisting of nitrogen, oxygen, sulfur, fluorine, and silicon atoms as $R^{12}$ include those described for the substituent, and suitable embodiments thereof are also the same as above.

$R^{12}$ may be at any of the ortho, meta, and para positions. To more suitably achieve the effects of the present invention, $R^{12}$ is preferably at the para position.

Examples of the alkyl group as $R^{13}$ or $R^{14}$ include those described for the alkyl group as $R^3$, and suitable embodiments thereof are also the same as above. $R^{13}$ and $R^{14}$ are each preferably an alkyl group.

To obtain better ice performance, fuel economy, and abrasion resistance, $R^{15}$ and $R^{16}$ are each preferably a hydrogen atom or a functional group containing at least one atom selected from the group consisting of nitrogen, oxygen, sulfur, fluorine, and silicon atoms.

$R^{18}$ in —COOR$^{18}$ represents a hydrogen atom or an alkyl group. Examples of the alkyl group include those described for the alkyl group as $R^3$, and suitable embodiments thereof are also the same as above.

$R^{18}$ is preferably an alkyl group.

Examples of the functional group containing at least one atom selected from the group consisting of nitrogen, oxygen, sulfur, fluorine, and silicon atoms as $R^{15}$ or $R^{16}$ include those described for the substituent, and suitable embodiments thereof are also the same as above.

$R^{15}$ and $R^{16}$ may each be at any of the ortho, meta, and para positions. To more suitably achieve the effects of the present invention, $R^{15}$ and $R^{16}$ are each preferably at the para position, and more preferably both at the para position.

The amount of the tetrazine compound per 100 parts by mass of the rubber component is 0.2 parts by mass or more, preferably 0.5 parts by mass or more, more preferably 0.8 parts by mass or more. When the amount is not less than the lower limit, the effects of the present invention tend to be well achieved. Moreover, the amount is 10 parts by mass or less, preferably 5.0 parts by mass or less, more preferably 3.0 parts by mass or less, still more preferably 2.5 parts by mass or less, particularly preferably 1.5 parts by mass or less. When the amount is not more than the upper limit, the effects of the present invention tend to be well achieved.

Herein, the amount of the tetrazine compound of formula (1) may refer to the combined amount of two or more tetrazine compounds, if present.

The rubber composition of the present invention contains silica as a reinforcing filler.

In addition to the silica, the reinforcing filler may include other fillers such as carbon black, calcium carbonate, talc, alumina, clay, aluminum hydroxide, aluminum oxide, and mica. Among these, carbon black is preferred in order to more suitably achieve the effects of the present invention.

The amount of the reinforcing filler per 100 parts by mass of the rubber component is preferably 15 parts by mass or more, more preferably 20 parts by mass or more, still more preferably 40 parts by mass or more, particularly preferably 60 parts by mass or more. When the amount is not less than the lower limit, sufficient reinforcement tends to be provided, and better abrasion resistance and ice performance tend to be obtained. The amount is also preferably 250 parts by mass or less, more preferably 120 parts by mass or less, still more preferably 100 parts by mass or less, particularly preferably 80 parts by mass or less. When the amount is not more than the upper limit, better fuel economy tends to be obtained.

Examples of the silica include dry silica (anhydrous silica) and wet silica (hydrous silica). Wet silica is preferred because it contains a large number of silanol groups.

The silica preferably has a nitrogen adsorption specific surface area ($N_2SA$) of 90 $m^2/g$ or more, more preferably 120 $m^2/g$ or more, still more preferably 150 $m^2/g$ or more. When the $N_2SA$ is not less than the lower limit, better abrasion resistance and ice performance can be obtained. The $N_2SA$ is preferably 400 $m^2/g$ or less, more preferably 200 $m^2/g$ or less, still more preferably 180 $m^2/g$ or less. When the $N_2SA$ is not more than the upper limit, better fuel economy can be obtained.

The nitrogen adsorption specific surface area of the silica is determined by the BET method in accordance with ASTM D3037-81.

The silica may be a commercial product of, for example, Degussa, Rhodia, Tosoh Silica Corporation, Solvay Japan, or Tokuyama Corporation.

The amount of the silica per 100 parts by mass of the rubber component is 10 parts by mass or more, preferably 20 parts by mass or more, more preferably 40 parts by mass or more, still more preferably 50 parts by mass or more. When the amount is not less than the lower limit, better ice performance, fuel economy, and abrasion resistance can be obtained. Moreover, the amount is 120 parts by mass or less, preferably 80 parts by mass or less, more preferably 75 parts by mass or less, still more preferably 70 parts by mass or less. When the amount is not more than the upper limit, the silica is more likely to disperse uniformly in the rubber composition, thereby resulting in better ice performance, fuel economy, and abrasion resistance.

The proportion of the silica based on 100% by mass of the total reinforcing filler is preferably 50% by mass or more, more preferably 60% by mass or more, still more preferably 70% by mass or more, particularly preferably 80% by mass or more, most preferably 90% by mass or more, and may be 100% by mass.

Any carbon black may be used. Examples include N134, N110, N220, N234, N219, N339, N330, N326, N351, N550, and N762. These may be used alone, or two or more of these may be used in combination.

The carbon black preferably has a nitrogen adsorption specific surface area ($N_2SA$) of 5 $m^2/g$ or more, more preferably 50 $m^2/g$ or more, still more preferably 100 $m^2/g$ or more. When the $N_2SA$ is not less than the lower limit, better abrasion resistance and ice performance tend to be obtained. The $N_2SA$ is also preferably 300 $m^2/g$ or less, more preferably 150 $m^2/g$ or less, still more preferably 130 $m^2/g$ or less. With a $N_2SA$ of not more than the upper limit, the carbon black tends to disperse better, thereby resulting in better abrasion resistance, ice performance, and fuel economy.

The nitrogen adsorption specific surface area of the carbon black is determined in accordance with JIS K6217-2: 2001.

The carbon black may be a commercial product of, for example, Asahi Carbon Co., Ltd., Cabot Japan K.K., Tokai Carbon Co., Ltd., Mitsubishi Chemical Corporation, Lion Corporation, NSCC Carbon Co., Ltd., or Columbia Carbon.

The amount of the carbon black, if present, per 100 parts by mass of the rubber component is preferably 3 parts by mass or more, more preferably 5 parts by mass or more. When the amount is not less than the lower limit, sufficient reinforcement tends to be provided, and better abrasion resistance and ice performance tend to be obtained. The amount is also preferably 50 parts by mass or less, more preferably 30 parts by mass or less, still more preferably 10 parts by mass or less. When the amount is not more than the upper limit, better fuel economy tends to be obtained.

To better achieve the effects of the present invention, the combined amount of the carbon black and silica per 100 parts by mass of the rubber component is preferably 20 to 130 parts by mass, more preferably 40 to 100 parts by mass, still more preferably 50 to 80 parts by mass.

The rubber composition of the present invention preferably contains a silane coupling agent together with silica.

Any silane coupling agent may be used. Examples include sulfide silane coupling agents such as bis(3-triethoxysilyl-propyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone, or two or more of these may be used in combination. Among these, sulfide or mercapto silane coupling agents are preferred in order to better achieve the effects of the present invention.

The silane coupling agent is preferably a silane coupling agent represented by the formula (2) below. In this case, better ice performance, fuel economy, and abrasion resistance can be obtained.

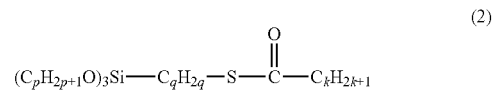

$$(C_pH_{2p+1}O)_3Si\text{---}C_qH_{2q}\text{---}S\text{---}\overset{\overset{O}{\|}}{C}\text{---}C_kH_{2k+1} \qquad (2)$$

In formula (2), p represents an integer of 1 to 3, q represents an integer of 1 to 5, and k represents an integer of 5 to 12.

In formula (2), p is an integer of 1 to 3, preferably 2. When p is 3 or less, the coupling reaction tends to proceed rapidly.

q is an integer of 1 to 5, preferably 2 to 4, more preferably 3. When q is 1 to 5, the synthesis tends to be facilitated.

k is an integer of 5 to 12, preferably 5 to 10, more preferably 6 to 8, still more preferably 7.

Examples of the silane coupling agent of formula (2) include 3-octanoylthio-1-propyltriethoxysilane.

The silane coupling agent may be a commercial product of, for example, Degussa, Momentive, Shin-Etsu Silicone, Tokyo Chemical Industry Co., Ltd., AZmax. Co., or Dow Corning Toray Co., Ltd.

The amount of the silane coupling agent, if present, per 100 parts by mass of the silica is preferably 3 parts by mass or more, more preferably 5 parts by mass or more. When the amount is 3 parts by mass or more, the incorporated silane coupling agent tends to produce its effect. The amount is also preferably 20 parts by mass or less, more preferably 10 parts by mass or less. When the amount is 20 parts by mass or less, an effect commensurate with the amount tends to be provided, and good processability during kneading tends to be obtained.

The present invention uses a low-molecular-weight diene polymer having a weight average molecular weight of 200,000 or less.

The monomer component for forming the low-molecular-weight diene polymer may be any diene monomer, and examples include conjugated diene compounds such as 1,3-butadiene, isoprene, 1,3-pentadiene, 2,3-dimethyl-1,3-butadiene, and 1,3-hexadiene, and branched conjugated diene compounds such as myrcene and farnesene. In addition to the diene monomer, a vinyl compound such as styrene, α-methylstyrene, α-vinylnaphthalene, or β-vinylnaphthalene may also be used as a monomer component.

Examples of the low-molecular-weight diene polymer include styrene-butadiene copolymers, butadiene polymers, isoprene polymers, acrylonitrile butadiene copolymers, myrcene polymers, farnesene polymers, myrcene-butadiene copolymers, myrcene-styrene copolymers, farnesene-butadiene copolymers, and farnesene-styrene copolymers. To more suitably achieve the effects of the present invention, styrene-butadiene copolymers, butadiene polymers, isoprene polymers, myrcene polymers, farnesene polymers, myrcene-butadiene copolymers, myrcene-styrene copolymers, farnesene-butadiene copolymers, and farnesene-styrene copolymers are preferred among these.

The low-molecular-weight diene polymer is preferably liquid at 25° C. Moreover, the double bonds in the conjugated diene units of the low-molecular-weight diene polymer may be hydrogenated.

The low-molecular-weight diene polymer preferably has a weight average molecular weight (Mw) of 1,000 or more, more preferably 1,500 or more, but preferably 150,000 or less, more preferably 100,000 or less, still more preferably 50,000 or less, particularly preferably 20,000 or less, most preferably 15,000 or less. When the Mw is within the range indicated above, the effects of the present invention (particularly the effect of improving ice performance) can be more suitably achieved.

The amount of the low-molecular-weight diene polymer, if present, per 100 parts by mass of the rubber component is preferably 1 part by mass or more, more preferably 5 parts by mass or more, but is preferably 50 parts by mass or less, more preferably 40 parts by mass or less, still more preferably 30 parts by mass or less. When the amount is within the range indicated above, the effects of the present invention (particularly the effect of improving ice performance) can be more suitably achieved.

The present invention may use a resin.

Any resin commonly used in the tire industry may be used. Examples include coumarone resins, styrene resins, terpene resins, dicyclopentadiene resins (DCPD resins), C5 petroleum resins, C9 petroleum resins, C5C9 petroleum resins, p-t-butylphenol acetylene resins, and acrylic resins. These may be used alone, or two or more of these may be used in combination. In particular, the resin preferably has a small number of unsaturated bonds in the structure other than a benzene ring in order to reduce the reactivity between the resin and the tetrazine compound, thereby achieving a balanced improvement in ice performance, fuel economy, and abrasion resistance. Such a resin can be identified by $H^1$-NMR analysis. With $H^1$-NMR analysis, it is difficult to precisely quantify the number of unsaturated bonds other than those in a benzene ring. However, a resin in which the number of hydrogen atoms with chemical shifts in the range of at least 4 ppm but not more than 6 ppm is 5% or less of the total number of hydrogen atoms is considered as having a small number of unsaturated bonds.

Examples of the resin having a small number of unsaturated bonds other than those in a benzene ring include hydrogenated terpene resins, hydrogenated dicyclopentadiene resins (hydrogenated DCPD resins), hydrogenated C5 petroleum resins, C9 petroleum resins, C5C9 petroleum resins, coumarone resins, and styrene resins. Preferred among these are resins in which the number of hydrogen atoms with $H^1$-NMR chemical shifts in the range of at least 4 ppm but not more than 9 ppm is 15% or less of the total number of hydrogen atoms. Examples of such resins include hydrogenated terpene resins and hydrogenated DCPD resins.

Any terpene resin having units derived from a terpene compound may be used. Examples include polyterpenes (resins produced by polymerization of terpene compounds), terpene aromatic resins (resins produced by copolymerization of terpene compounds with aromatic compounds), and aromatic-modified terpene resins (resins obtained by modification of terpene resins with aromatic compounds).

The term "terpene compound" refers to a hydrocarbon having a composition represented by $(C_5H_8)_n$ or an oxygen-containing derivative thereof, each of which has a terpene backbone and is classified as, for example, a monoterpene $(C_{10}H_{16})$, sesquiterpene $(C_{15}H_{24})$, or diterpene $(C_{20}H_{32})$. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. Other examples of the terpene compound include resin acids (rosin acids) such as abietic acid, neoabietic acid, palustric acid, levopimaric acid, pimaric acid, and isopimaric acid. In other words, the terpene resins include rosin resins mainly containing rosin acids produced by processing pine resin. Examples of the rosin resins include natural rosin resins (polymerized rosins) such as gum rosins, wood rosins, and tall oil rosins, as well as modified rosin resins such as maleic acid-modified rosin resins and rosin-modified phenol resins, rosin esters such as rosin glycerol esters, and disproportionated rosin resins obtained by disproportionation of rosin resins.

The aromatic compounds may be any compound having an aromatic ring, and examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; and styrene and styrene derivatives such as alkylstyrenes, alkoxystyrenes, and unsaturated hydrocarbon group-containing styrenes. Styrene is preferred among these.

The resin preferably has a softening point of 30° C. or higher, more preferably 60° C. or higher, still more preferably 80° C. or higher, particularly preferably 100° C. or higher. When the softening point is 30° C. or higher, better abrasion resistance and ice performance tend to be obtained. The softening point is also preferably 160° C. or lower, more preferably 140° C. or lower. With a softening point of 160° C. or lower, the resin tends to disperse well, thereby resulting in better abrasion resistance, ice performance, and fuel economy.

In the present invention, the softening point of the resin is determined in accordance with JIS K 6220-1:2001 using a ring and ball softening point measuring apparatus and defined as the temperature at which the ball drops down.

The resin may be a commercial product of, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., or Taoka Chemical Co., Ltd.

The amount of the resin, if present, per 100 parts by mass of the rubber component is preferably 3 parts by mass or more, more preferably 5 parts by mass or more. When the amount is 3 parts by mass or more, better ice performance and abrasion resistance tend to be obtained. The amount is also preferably 150 parts by mass or less, more preferably 80 parts by mass or less, still more preferably 50 parts by mass or less. When the amount is 150 parts by mass or less, better abrasion resistance and fuel economy tend to be obtained.

The rubber composition preferably satisfies the equation: Y/X=5 to 100, more preferably 5 to 60, still more preferably 10 to 30, wherein X denotes the amount of the tetrazine compound per 100 parts by mass of the rubber component, and Y denotes the amount of the resin, preferably the resin having unsaturated bonds other than those in a benzene ring, per 100 parts by mass of the rubber component. When the Y/X ratio is within the range indicated above, better ice performance, fuel economy, and abrasion resistance can be obtained.

The rubber composition of the present invention may contain an oil.

Examples of the oil include process oils and plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, *camellia* oil, jojoba oil, macadamia nut oil, and tung oil. These may be used alone, or two or more of these may be used in combination.

The oil may be a commercial product of, for example, Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

The amount of the oil, if present, per 100 parts by mass of the rubber component is preferably 1 part by mass or more, more preferably 10 parts by mass or more, but is preferably 60 parts by mass or less, more preferably 40 parts by mass or less.

The amount of the oil here includes the amount of the oil contained in rubber (oil-extended rubber).

The rubber composition of the present invention preferably contains a wax.

Any wax may be used. Examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone, or two or more of these may be used in combination.

The wax may be a commercial product of, for example, Ouchi Shinko Chemical Industrial Co., Ltd., Nippon Seiro Co., Ltd., or Seiko Chemical Co., Ltd.

The amount of the wax, if present, per 100 parts by mass of the rubber component is preferably 0.5 parts by mass or more, more preferably 1 part by mass or more, but is preferably 10 parts by mass or less, more preferably 7 parts by mass or less.

The rubber composition of the present invention preferably contains an antioxidant.

Examples of the antioxidant include: naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)-propionate]methane. These may be used alone, or two or more of these may be used in combination. Among these, p-phenylenediamine or quinoline antioxidants are preferred, with N-(1,3-dimethylbutyl)-N'-phenyl-p-phenylenediamine or 2,2,4-trimethyl-1,2-dihydroquinoline polymer being more preferred.

The antioxidant may be a commercial product of, for example, Seiko Chemical Co., Ltd., Sumitomo Chemical Co., Ltd., Ouchi Shinko Chemical Industrial Co., Ltd., or Flexsys.

The amount of the antioxidant, if present, per 100 parts by mass of the rubber component is preferably 1 part by mass or more, more preferably 2 parts by mass or more, but is preferably 10 parts by mass or less, more preferably 7 parts by mass or less.

The rubber composition of the present invention preferably contains stearic acid.

Conventional stearic acid may be used. Examples include commercial products of NOF Corporation, Kao Corporation, FUJIFILM Wako Pure Chemical Corporation, Chiba Fatty Acid Co., Ltd., etc.

The amount of the stearic acid, if present, per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the effects of the present invention tend to be well achieved.

The rubber composition of the present invention preferably contains zinc oxide.

Conventional zinc oxide may be used. Examples include commercial products of Mitsui Mining & Smelting Co., Ltd., Toho Zinc Co., Ltd., HakusuiTech Co., Ltd., Seido Chemical Industry Co., Ltd., Sakai Chemical Industry Co., Ltd., etc.

The amount of the zinc oxide, if present, per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the effects of the present invention tend to be better achieved.

The rubber composition of the present invention preferably contains sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone, or two or more of these may be used in combination.

The sulfur may be a commercial product of, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The amount of the sulfur, if present, per 100 parts by mass of the rubber component is preferably 0.5 parts by mass or more, more preferably 0.8 parts by mass or more, but is preferably 10 parts by mass or less, more preferably 5 parts by mass or less, still more preferably 3 parts by mass or less. When the amount is within the range indicated above, the effects of the present invention tend to be well achieved.

The rubber composition of the present invention preferably contains a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, N-oxyethylene-2-benzothiazole sulfonamide, and N,N'-diisopropyl-2-benzothiazole sulfenamide; and guanidine vulcanization accelerators such as diphenylguanidine, diorthotolylguanidine, and orthotolylbiguanidine. These may be used alone, or two or more of these may be used in combination.

Among these, sulfenamide and/or guanidine vulcanization accelerators are preferred in order to more suitably achieve the effects of the present invention.

The amount of the vulcanization accelerator, if present, per 100 parts by mass of the rubber component is preferably 1 part by mass or more, more preferably 2 parts by mass or more, but is preferably 10 parts by mass or less, more preferably 7 parts by mass or less. When the amount is within the range indicated above, the effects of the present invention tend to be well achieved.

The rubber composition may contain additives commonly used in the tire industry, in addition to the above-mentioned components. Examples of the additives include processing aids such as plasticizers and lubricants; and vulcanizing agents other than sulfur, e.g., organic crosslinking agents and organic peroxides.

The rubber composition of the present invention may be prepared by common methods. Specifically, it may be prepared by kneading the components using a kneading machine such as a Banbury mixer, a kneader, or an open roll mill, and vulcanizing the kneaded mixture. Since the tetrazine compound used in the present invention is expected to interact with a reinforcing filler (particularly carbon black or silica) and also to contribute to the dispersibility of the reinforcing filler, the tetrazine compound is preferably kneaded with the rubber component (particularly polybutadiene rubber) so that the tetrazine compound is dispersed in the rubber component before or simultaneously with mixing the reinforcing filler (particularly carbon black or silica).

In order to cause a sufficient reaction between the at least one diene rubber (particularly polybutadiene rubber) and the tetrazine compound, it is preferred to knead the at least one diene rubber (particularly polybutadiene rubber) with the tetrazine compound to prepare a masterbatch, and then knead the masterbatch with silica. In other words, the pneumatic tire of the present invention is preferably produced by a method including the steps of: preparing a masterbatch by kneading the at least one diene rubber (particularly polybutadiene rubber) with the tetrazine compound; and kneading the masterbatch obtained in the masterbatch preparation step with silica. In this method, the amount of the at least one diene rubber (particularly polybutadiene rubber) based on 100% by mass of the rubber component kneaded in the masterbatch preparation step is preferably 60% by mass or more, more preferably 80% by mass or more, still more preferably 90% by mass or more, most preferably 100% by mass (i.e., the rubber component kneaded in the masterbatch preparation step consists only of the at least one diene rubber (particularly polybutadiene rubber)) to cause a sufficient reaction between the diene rubber (particularly polybutadiene rubber) and the tetrazine compound to more suitably achieve the effects of the present invention.

Moreover, to more suitably achieve the effects of the present invention, the masterbatch preparation step preferably excludes the kneading of silica, and the amount of the silica kneaded in the masterbatch preparation step per 100 parts by mass of the rubber component kneaded in the masterbatch preparation step is preferably 5 parts by mass or less, more preferably 3 parts by mass or less, still more preferably 1 part by mass or less, particularly preferably 0.5 parts by mass or less, most preferably 0 parts by mass.

Moreover, to more suitably achieve the effects of the present invention, the amount of the tetrazine compound kneaded in the masterbatch preparation step per 100 parts by mass of the rubber component kneaded in the masterbatch preparation step is 0.1 parts by mass or more, preferably 0.5 parts by mass or more, more preferably 0.8 parts by mass or more, but is 3.0 parts by mass or less, preferably 2.5 parts by mass or less, more preferably 1.5 parts by mass or less.

The kneading conditions are as follows. When additives other than vulcanizing agents and vulcanization accelerators are compounded, the kneading temperature is usually 50 to 200° C., preferably 80 to 190° C., and the kneading time is usually 30 seconds to 30 minutes, preferably 1 to 30 minutes.

When vulcanizing agents and vulcanization accelerators are compounded, the kneading temperature is usually 100° C. or lower, preferably from room temperature to 80° C. Then, the composition containing a vulcanizing agent(s) and/or vulcanization accelerator(s) is usually vulcanized by press vulcanization, for example. The vulcanization temperature is usually 120 to 200° C., preferably 140 to 180° C.

The rubber composition of the present invention is suitable for use in treads (cap treads), but may also be used in tire components other than treads, such as sidewalls, base treads, undertreads, clinch apexes, bead apexes, breaker cushion rubbers, carcass cord topping rubbers, insulations, chafers, or innerliners, or in side reinforcing layers of run-flat tires.

The pneumatic tire of the present invention can be produced using the rubber composition by usual methods.

Specifically, the unvulcanized rubber composition containing the components may be extruded into the shape of a tire component such as a tread and assembled with other tire components on a tire building machine in a usual manner to build an unvulcanized tire, which may then be heated and pressurized in a vulcanizer to produce a tire.

The pneumatic tire of the present invention may be suitably used as a tire for passenger vehicles, large passenger vehicles, large SUVs, heavy load vehicles such as trucks and buses, light trucks, or two-wheeled vehicles, or as a run-flat tire. In particular, since the pneumatic tire is excellent in ice performance, it may be more suitably used as a studless winter tire (winter tire).

EXAMPLES

The present invention is specifically described with reference to examples, but the present invention is not limited to the examples.

The chemicals used in the examples and comparative examples are listed below.

NR: TSR20
BR: high-cis BR (cis content: 97% by mass, Mw: 400,000)
SBR: NS116 (styrene content: 20% by weight) available from JSR Corporation
Carbon black: SHOBLACK N220 (N220, $N_2SA$: 111 $m^2/g$) available from Cabot Japan K.K.
Silica: Ultrasil VN3 ($N_2SA$: 175 $m^2/g$) available from Degussa
Silane coupling agent: NXT (3-octanoylthio-1-propyltriethoxysilane) available from Momentive
Tetrazine compound A: a compound of formula (1-1-1)
Tetrazine compound B: a compound of formula (1-2-1)
Tetrazine compound C: a compound of formula (1-3-1)
Tetrazine compound D: a compound of formula (1-4-1)

Oil: Diana Process P523 available from Idemitsu Kosan Co., Ltd.

Low-molecular-weight diene polymer (1): the low-molecular-weight diene polymer prepared in Production Example 1 below Low-molecular-weight diene polymer (2): the low-molecular-weight diene polymer prepared in Production Example 2 below Low-molecular-weight diene polymer (3): the low-molecular-weight diene polymer prepared in Production Example 3 below Stearic acid: stearic acid "TSUBAKI" available from NOF Corporation Zinc oxide: Zinc oxide #1 available from Mitsui Mining & Smelting Co., Ltd.

Antioxidant: OZONONE 6C (N-(1,3-dimethylbutyl)-N'-phenyl-p-phenylenediamine) available from Seiko Chemical Co., Ltd.

Wax: Ozoace 0355 available from Nippon Seiro Co., Ltd.

Sulfur: powdered sulfur available from Tsurumi Chemical Industry Co., Ltd.

Vulcanization accelerator (1): NOCCELER NS (N-tert-butyl-2-benzothiazolylsulfenamide) available from Ouchi Shinko Chemical Industrial Co., Ltd.

Vulcanization accelerator (2): NOCCELER D (diphenylguanidine) available from Ouchi Shinko Chemical Industrial Co., Ltd.

Production Example 1 (Synthesis of Low-Molecular-Weight Diene Polymer (1))

To a dried and nitrogen-purged 3 L pressure-resistant stainless steel vessel were charged 2000 mL of hexane, 110 g of butadiene, 90 g of styrene, and 0.22 mmol of tetramethylethylenediamine (TMEDA), as well as 35 mmol of n-butyllithium (n-BuLi), followed by performing a polymerization reaction at 50° C. for five hours, after which 1.15 mL of a 1M isopropanol/hexane solution was added dropwise to terminate the reaction. The reaction solution was cooled and subsequently air-dried overnight, followed by drying under reduced pressure for two days to give 200 g of a low-molecular-weight diene polymer (1). The polymerization addition ratio ("dried weight/charged weight") was almost 100%. The low-molecular-weight diene polymer (1) was a polymer (styrene-butadiene copolymer) having a butadiene content of 55% by mass, a styrene content of 45% by mass, and a Mw of 5000.

Production Example 2 (Synthesis of Low-Molecular-Weight Diene Polymer (2))

To a dried and nitrogen-purged 1 L glass vessel were charged 500 mL of hexane, 46 g of tetrahydrofuran (THF), and 40 mmol of n-butyllithium (n-BuLi). Then, a polymerization reaction was performed while adding dropwise a liquid mixture of 100 mL of hexane, 150 g of myrcene, and 125 g of styrene to the reaction vessel over two hours. Immediately after completion of the dropwise addition, 10 mL of a 2M isopropanol/hexane solution was added dropwise to terminate the reaction. The reaction solution was cooled and subsequently air-dried overnight, followed by drying under reduced pressure for two days to give 275 g of a low-molecular-weight diene polymer (2). The polymerization conversion ratio was almost 100%. The low-molecular-weight diene polymer (2) was a polymer (myrcene-styrene copolymer) having a myrcene content of 55% by mass, a styrene content of 45% by mass, and a Mw of 5320.

Production Example 3 (Synthesis of Low-Molecular-Weight Diene Polymer (3))

To a dried and nitrogen-purged 1 L glass vessel were charged 500 mL of hexane, 46 g of THF, and 40 mmol of n-butyllithium (n-BuLi). Then, a polymerization reaction was performed while adding dropwise a liquid mixture of 100 mL of hexane, 150 g of farnesene, and 125 g of styrene to the reaction vessel over two hours. Immediately after completion of the dropwise addition, 10 mL of a 2M isopropanol/hexane solution was added dropwise to terminate the reaction. The reaction solution was cooled and subsequently air-dried overnight, followed by drying under reduced pressure for two days to give 275 g of a low-molecular-weight diene polymer (3). The polymerization conversion ratio was almost 100%. The low-molecular-weight diene polymer (3) was a polymer (farnesene-styrene copolymer) having a farnesene content of 55% by mass, a styrene content of 45% by mass, and a Mw of 5420.

Examples and Comparative Examples

The materials in the amounts shown in Table 1 were kneaded to prepare an unvulcanized rubber composition. The unvulcanized rubber composition was formed into a tread shape and then assembled with other tire components to build an unvulcanized tire, which was then heated and pressurized to prepare a test tire (size: 195/65R15). The test tires prepared as above were evaluated as described below. Table 1 shows the results.

(Silica Dispersion)

Test specimens were cut out of the rubber pieces collected from the tread of each example. The number of silica aggregates in the test specimens was counted in accordance with JIS K 6812 "Method for the assessment of the degree of pigment or carbon black dispersion in polyolefin pipes, fittings and compounds" to calculate the degree of dispersion (%). The degree of silica dispersion of each formulation example is expressed as an index, with Comparative Example 1 set equal to 100. A higher silica dispersion index indicates higher and better dispersion of silica.

(Ice Performance)

The test tires were mounted on a front-engine, rear-wheel-drive car of 2000 cc displacement made in Japan. The car was driven on ice under the conditions described below to evaluate ice performance. In the evaluation of ice performance, specifically, the car was driven on ice, and the brakes that lock up were applied at 30 km/h. The stopping distance (brake stopping distance on ice), which was the distance required for the car to stop after the braking, was measured and expressed as an index, with Comparative Example 1 set equal to 100. A higher index indicates better ice performance (grip performance on ice).

(On ice)

Test site: Test track in Nayoro, Hokkaido
Temperature: −6 to −1° C.

(Fuel Economy)

The rolling resistance of the test tires mounted on a rim (15×6JJ) and run at an internal pressure of 230 kPa, a load of 3.43 kN, and a speed of 80 km/h was measured using a rolling resistance tester and expressed as an index (fuel economy index), with Comparative Example 1 set equal to 100. A higher index indicates better fuel economy.

(Abrasion Resistance)

The test tires of each example were mounted on a front-engine, front-wheel-drive car made in Japan. After running 8000 km, the groove depth in the tire tread portion was measured. A distance that caused a 1 mm decrease in tire groove depth was calculated and expressed as an index (abrasion resistance index), with Comparative Example 1 set equal to 100. A higher index means that a longer distance is required to cause a 1 mm decrease in tire groove depth, indicating better abrasion resistance.

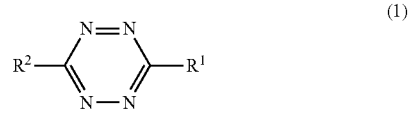

(1)

wherein
$R^1$ and $R^2$ may be the same or different and each represent a hydrogen atom,

TABLE 1

|  |  | Example | | | | | | Comparative Example | | | | |
|---|---|---|---|---|---|---|---|---|---|---|---|---|
|  |  | 1 | 2 | 3 | 4 | 5 | 6 | 1 | 2 | 3 | 4 | 5 |
| Amount (parts by mass) | NR | 50 | 50 | 50 | 50 | 50 | 50 | 50 | 60 | 40 | — | — |
|  | BR | 50 | 50 | 50 | 50 | 50 | 50 | 50 | 40 | 60 | — | — |
|  | SBR | — | — | — | — | — | — | — | — | — | 100 | 100 |
|  | Carbon black | 5.0 | 5.0 | 5.0 | 5.0 | 5.0 | 5.0 | 5.0 | 5.0 | 5.0 | 5.0 | 5.0 |
|  | Silica | 60 | 60 | 60 | 60 | 60 | 60 | 60 | 60 | 60 | 60 | 60 |
|  | Silane coupling agent | 4.8 | 4.8 | 4.8 | 4.8 | 4.8 | 4.8 | 4.8 | 4.8 | 4.8 | 4.8 | 4.8 |
|  | Tetrazine compound A | 1.0 | 1.0 | 1.0 | — | — | — | — | — | — | 1.0 | — |
|  | Tetrazine compound B | — | — | — | 1.0 | — | — | — | — | — | — | — |
|  | Tetrazine compound C | — | — | — | — | 1.0 | — | — | — | — | — | — |
|  | Tetrazine compound D | — | — | — | — | — | 1.0 | — | — | — | — | — |
|  | Oil | — | — | — | — | — | — | 20 | 20 | 20 | 20 | 20 |
|  | Low-molecular-weight diene polymer (1) | 20 | — | — | — | — | — | — | — | — | — | — |
|  | Low-molecular-weight diene polymer (2) | — | 20 | — | — | — | — | — | — | — | — | — |
|  | Low-molecular-weight diene polymer (3) | — | — | 20 | 20 | 20 | 20 | — | — | — | — | — |
|  | Stearic acid | 2.0 | 2.0 | 2.0 | 2.0 | 2.0 | 2.0 | 2.0 | 2.0 | 2.0 | 2.0 | 2.0 |
|  | Zinc oxide | 3.0 | 3.0 | 3.0 | 3.0 | 3.0 | 3.0 | 3.0 | 3.0 | 3.0 | 3.0 | 3.0 |
|  | Antioxidant | 2.0 | 2.0 | 2.0 | 2.0 | 2.0 | 2.0 | 2.0 | 2.0 | 2.0 | 2.0 | 2.0 |
|  | Wax | 2.0 | 2.0 | 2.0 | 2.0 | 2.0 | 2.0 | 2.0 | 2.0 | 2.0 | 2.0 | 2.0 |
|  | Sulfur | 1.5 | 1.5 | 1.5 | 1.5 | 1.5 | 1.5 | 1.5 | 1.5 | 1.5 | 1.5 | 1.5 |
|  | Vulcanization accelerator (1) | 1.5 | 1.5 | 1.5 | 1.5 | 1.5 | 1.5 | 1.5 | 1.5 | 1.5 | 1.5 | 1.5 |
|  | Vulcanization accelerator (2) | 1.0 | 1.0 | 1.0 | 1.0 | 1.0 | 1.0 | 1.0 | 1.0 | 1.0 | 1.0 | 1.0 |
| Evaluation results | Silica dispersion index | 110 | 110 | 110 | 105 | 105 | 110 | 100 | 95 | 105 | 105 | 105 |
|  | Ice performance index (a) | 115 | 115 | 115 | 110 | 110 | 115 | 100 | 95 | 105 | 70 | 70 |
|  | Fuel economy index (b) | 105 | 105 | 105 | 100 | 100 | 105 | 100 | 105 | 100 | 110 | 105 |
|  | Abrasion resistance index (c) | 110 | 110 | 110 | 105 | 105 | 110 | 100 | 105 | 90 | 110 | 105 |
|  | Total of indices (a) to (c) | 330 | 330 | 330 | 315 | 315 | 330 | 300 | 305 | 295 | 290 | 280 |

As shown in Table 1, a balanced improvement in ice performance, fuel economy, and abrasion resistance was achieved in the pneumatic tires of the examples which contained a rubber component including at least 80% by mass in total of at least one of an isoprene-based rubber, a polybutadiene rubber, or a styrene-butadiene rubber and contained, per 100 parts by mass of the rubber component, 10 to 120 parts by mass of silica, 0.2 to 10 parts by mass of a tetrazine compound of formula (1), and 1 to 50 parts by mass of a low-molecular-weight diene polymer having a weight average molecular weight of 200,000 or less.

The invention claimed is:

1. A rubber composition for tires, comprising:
a rubber component comprising at least 80% by mass in total of at least one of an isoprene-based rubber, a polybutadiene rubber, or a styrene-butadiene rubber;
the rubber composition comprising, per 100 parts by mass of the rubber component:
10 to 120 parts by mass of silica;
0.2 to 10 parts by mass of a tetrazine compound represented by the formula (1) below; and
1 to 50 parts by mass of a low-molecular-weight diene polymer having a weight average molecular weight of 200,000 or less, —COOR$^3$ in which R$^3$ represents either a hydrogen atom or an alkyl group, or a C1-C11 monovalent hydrocarbon group optionally containing a heteroatom, and
R$^1$ and R$^2$ may each form a salt;
the rubber composition further comprising a resin having unsaturated bonds other than those in a benzene ring; and
the rubber composition satisfying the equation: Y/X=5 to 100 wherein
X denotes the amount of the tetrazine compound per 100 parts by mass of the rubber component, and Y denotes the amount of the resin per 100 parts by mass of the rubber component.

2. The rubber composition for tires according to claim 1, wherein the tetrazine compound is a compound represented by the following formula (1-1), (1-2), (1-3), or (1-4):

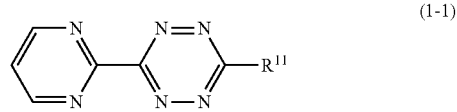

(1-1)

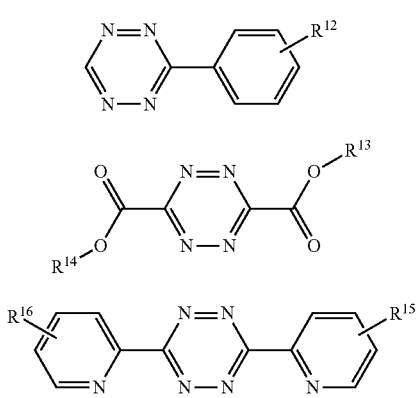

wherein in formula (1-1), $R^{11}$ represents a hydrogen atom, —COOR$^{17}$ in which $R^{17}$ represents either a hydrogen atom or an alkyl group, or a C1-C11 monovalent hydrocarbon group optionally containing a heteroatom, and $R^{11}$ may form a salt;

in formula (1-2), $R^{12}$ represents a functional group containing at least one atom selected from the group consisting of nitrogen, oxygen, sulfur, fluorine, and silicon atoms, and $R^{12}$ may form a salt;

in formula (1-3), $R^{13}$ and $R^{14}$ may be the same or different and each represent a hydrogen atom or an alkyl group, and $R^{13}$ and $R^{14}$ may each form a salt; and in formula (1-4), $R^{15}$ and $R^{16}$ may be the same or different and each represent a hydrogen atom, —COOR$^{18}$ in which $R^{18}$ represents either a hydrogen atom or an alkyl group, or a functional group containing at least one atom selected from the group consisting of nitrogen, oxygen, sulfur, fluorine, and silicon atoms, and $R^{15}$ and $R^{16}$ may each form a salt.

3. The rubber composition for tires according to claim 1, wherein the tetrazine compound is a compound represented by the following formula (1-1-1), (1-1-2), (1-2-1), (1-3-1), (1-4-1), or (1-4-2):

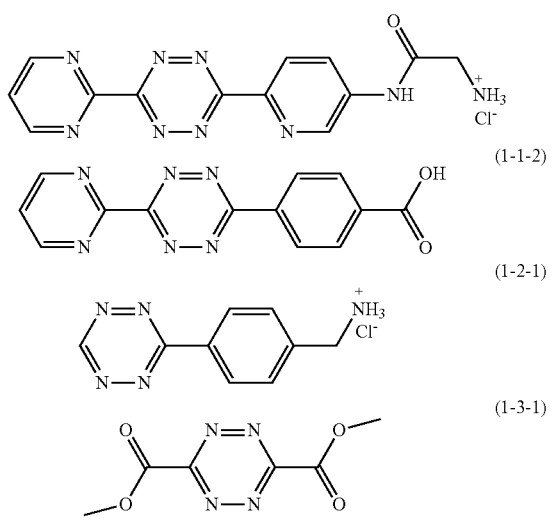

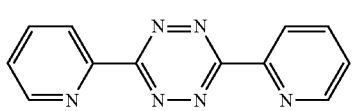

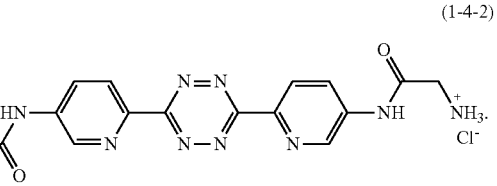

4. The rubber composition for tires according to claim 1, wherein the polybutadiene rubber is present in an amount of 15 to 80% by mass based on 100% by mass of the rubber component.

5. The rubber composition for tires according to claim 1, wherein the isoprene-based rubber is present in an amount of 15 to 80% by mass based on 100% by mass of the rubber component.

6. A pneumatic tire, comprising a tread comprising the rubber composition according to claim 1.

7. The pneumatic tire according to claim 6, wherein the pneumatic tire is a studless winter tire.

8. A rubber composition for tires, comprising a rubber component comprising:
at least 80% by mass in total of at least one of an isoprene-based rubber, a polybutadiene rubber, or a styrene-butadiene rubber;
the rubber composition comprising, per 100 parts by mass of the rubber component:
10 to 120 parts by mass of silica;
0.2 to 10 parts by mass of a tetrazine compound represented by the formula (1) below; and
1 to 50 parts by mass of a low-molecular-weight diene polymer having a weight average molecular weight of 200,000 or less,

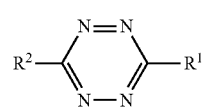

wherein
$R^1$ and $R^2$ may be the same or different and each represent a hydrogen atom,
—COOR$^3$ in which $R^3$ represents either a hydrogen atom or an alkyl group, or a C1-C11 monovalent hydrocarbon group optionally containing a heteroatom, and $R^1$ and $R^2$ may each form a salt; and
the rubber composition further comprising a resin, wherein the resin is at least one selected from the group consisting of hydrogenated terpene resin, hydrogenated dicyclopentadiene resin, hydrogenated C5 petroleum resin, C9 petroleum resin, C5C9 petroleum resin, coumarone resin, and styrene resin.

9. A rubber composition for tires, comprising a rubber component comprising:
at least 80% by mass in total of at least one of an isoprene-based rubber, a polybutadiene rubber, or a styrene-butadiene rubber,
the rubber composition comprising, per 100 parts by mass of the rubber component:

10 to 120 parts by mass of silica;
0.2 to 10 parts by mass of a tetrazine compound represented by the formula (1) below; and
1 to 50 parts by mass of a low-molecular-weight diene polymer having a weight average molecular weight of 200,000 or less,

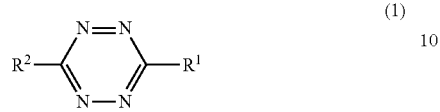

(1)

wherein
$R^1$ and $R^2$ may be the same or different and each represent a hydrogen atom,
—$COOR^3$ in which $R^3$ represents either a hydrogen atom or an alkyl group, or a C1-C11 monovalent hydrocarbon group optionally containing a heteroatom, and
$R^1$ and $R^2$ may each form a salt; and
the rubber composition further comprising a resin having unsaturated bonds other than those in a benzene ring, wherein the amount of the resin is 3 to 150 parts by mass per 100 parts by mass of the rubber component.

* * * * *